Patented Apr. 5, 1932

1,852,970

UNITED STATES PATENT OFFICE

ERNST HUG AND HEINRICH WERDENBERG, OF NEU-ALLSCHWIL, NEAR BASEL, SWITZERLAND, ASSIGNORS TO THE FIRM "DURAND & HUGUENIN S. A.", OF BASEL, SWITZERLAND

PRODUCTION OF COLOR DISCHARGE EFFECTS WITH GALLOCYANINE DYESTUFFS

No Drawing. Application filed April 22, 1929, Serial No. 357,326, and in Germany May 2, 1928.

For the production of color discharge effects according to the principle of reduction the gallocyanine dyestuffs can often not be used, because some of these dyestuffs are not sufficiently stable towards hydrosulphite and in printing processes of this kind yield muddy, useless tints.

It has hitherto been a defect that there has been no pure blue to greenish blue dyeing chromium-dyestuff of sufficient stability to hydrosulphite.

It has now been found that practically valuable color discharge effects, i. e. vivid and particularly also pure blue to greenish blue tints can be obtained by selecting, for the usual illuminating discharge process, such gallocyanine dyestuffs or derivatives thereof which are derived from a meta-substituted alkyl-aniline, and using these in the usual color discharge process with aid of hydrosulphite.

Gallocyanine dyestuffs of this kind may be represented by the following general formula:

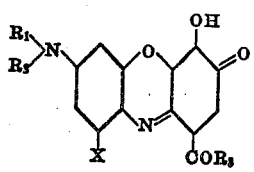

wherein $R_1$ represents an alkyl, $R_2$ hydrogen or alkyl, $R_3$ the groups OH, $NH_2$, NH-aryl, O-alkyl, and X a substituent, such as for instance $CH_3$, a halogen, $NH_2$, a substituted $NH_2$ or others. Obviously it is also possible to employ, gallocyanine dyestuffs being further substituted in their oxazine-nucleus, provided that these bodies still contain the substituent X. This latter originates from a meta-substituted alkyl-aniline which is used for the synthesis of this dyestuff type.

The new process is explained by the following examples:

Example I

The following printing color is prepared:

20 grams of the gallocyanine dyestuff produced by anilidation and sulphonation of the gallocyanine obtained from nitroso-diethyl-meta-toluidine and gallamide, corresponding probably to the following formula:

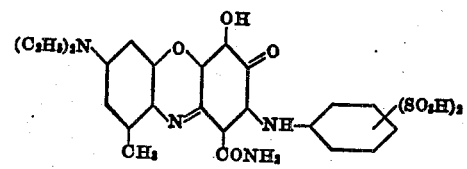

220 grams of hot water and
600 grams of neutral starch tragacanth thickening are dissolved warm, the solution is cooled down and mixed with
100 grams of hydrosulphite NF conc. powder and
60 grams of a solution of chromium acetate of 20° Bé.
―――
1000 grams.

This color is then printed on cotton which has been dyed with diamine red and the printed material is aged or steamed for 5 minutes in the rapid ager or steamer, hung out and washed.

There are thus obtained bright or vivid greenish-blue discharge effects on a diamine red ground.

The corresponding dyestuff which is derived from diethylaniline (instead of diethyl-meta-toluidine) yields, under like conditions, only muddy, worthless tints.

Example II

For the dyestuff used in the printing paste described in Example I there is substituted another which is obtained by converting the gallocyanine dyestuff from nitroso-dimethyl-meta-chloraniline and gallamide into its anilido-compound and by sulphonating the latter dyestuff which probably corresponds to the following formula:

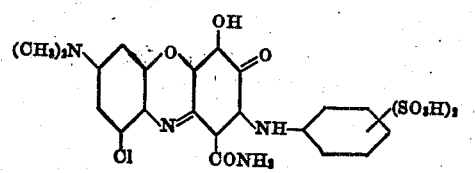

The color paste is printed on cotton which has previously been dyed with diamine red, and the material is steamed for 5 minutes in the rapid ager or steamer, hung out and washed.

The discharge effects thus obtained are vivid blue of more reddish tint than those obtained according to the procedure of Example I.

Discharge effects, however, which are obtained with the corresponding dyestuff derived from dimethylaniline (instead of dimethyl-meta-chloraniline) are in contrast muddy and useless.

Example III

In this example there is used the gallocyanine dyestuff which is produced by anilidation and sulphonation of the dyestuff obtained from nitrosomonoethyl-meta-toluidine and gallamide and which probably corresponds to the following formula:

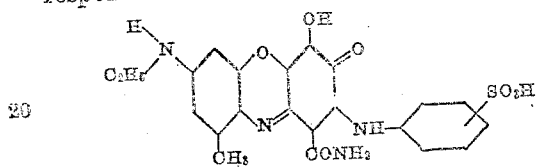

The printing paste has the same composition as that given in Example I. It is printed on a diamine red ground as described in Example I and the material is steamed in like manner.

The discharge effects are vivid blue, considerably more reddish than those obtained according to Example I or Example II.

With the corresponding dyestuff which, instead of from nitroso-monoethyl-meta-toluidine, is obtained from nitroso-monoethyl-ortho-toluidine, (the difference consisting merely in the position of the methyl-group) there are obtained by following a like procedure tints which are only muddy and useless.

Example IV

The following printing paste is prepared:

20 grams of the leuco compound of the gallocyanine dyestuff produced by splitting off the carboxyl group in the gallocyanine obtained from nitroso-dimethyl-meta-toluidine and gallic acid, and which probably corresponds to the following formula:

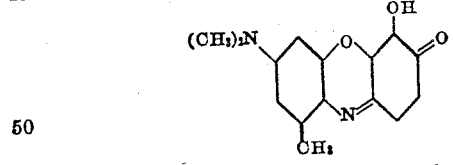

600 grams of neutral starch tragacanth thickening are dissolved in
220 grams of hot water. The solution is cooled down and there are added
100 grams of hydrosulphite NF conc. powder and
60 grams of a solution of chromium acetate of 20° Bé.
————
1000 grams.

With respect to the diamine red ground-colors mentioned in the examples, it is question of dyeings obtained with dyestuffs referred in the Color Index under Nos. 448,449, 451,452. All these dyestuffs can be discharged with reducing agents, i. e. can be destroyed.

This printing paste is printed on a diamine red ground, the material is dried, steamed for 5 minutes in the rapid steamer, hung out and washed.

The discharge effects thus obtained are very vivid and intense violet, whereas those obtained with the leuco compound of the corresponding dyestuff (nitrosodimethyl-aniline + gallic acid, decarboxylated) are muddy and, therefore, quite useless.

Similar results, that is to say bright or vivid color discharge effects can be obtained by using gallocyanine dyestuffs of the above mentioned type which are derived on the one hand from mono-ethyl-meta-chloraniline, tetramethyl-meta-phenylenediamine or dimethyl-acetyl-meta-phenylenediamine and on the other hand from gallic acid, gallamide or an ester of gallic acid.

What we claim is:—

1. A process for obtaining vivid color discharge effects according to the principle of reduction, consisting in employing for a discharge printing paste a dyestuff of the gallocyanine series which is derived from a meta-substituted alkylaniline, in conjunction with a reducing agent and with the other ingredients as used for the said purpose, in printing the paste thus obtained upon a ground dyeing capable of being destroyed by reducing agents and in subjecting the material to further treatment for producing illuminating discharge effects.

2. A process for obtaining vivid color discharge effects according to the principle of reduction, consisting in employing for a discharge printing paste a dyestuff of the gallocyanine series, derived from a meta-substituted alkylaniline and being further substituted in its oxazine-nucleus, in conjunction with a reducing agent and with the other ingredients as used for the said purpose, in printing the paste thus obtained upon a ground dyeing capable of being destroyed by reducing agents and in subjecting the material to further treatment for producing illuminating discharge effects.

3. A process for obtaining vivid color discharge effects according to the principle of reduction, consisting in employing for a discharge printing paste a dyestuff of the gallocyanine series, derived from a meta-substituted alkylaniline and substituted in its oxazine-nucleus by a sulpho aryl-amino group, in conjunction with a reducing agent and with the other ingredients as used for the said purpose, in printing the paste thus obtained upon a ground dyeing capable of being destroyed by reducing agents and in subjecting the material to further treatment for producing illuminating discharge effects.

4. A process for obtaining vivid color discharge effects according to the principle of reduction, consisting in employing for a discharge printing paste a dyestuff of the gallocyanine series, derived from a meta-substituted alkylaniline and substituted in its oxazine-nucleus by a sulpho anilido group, in conjunction with a reducing agent and with the other ingredients as used for the said purpose, in printing the paste thus obtained upon a ground dyeing capable of being destroyed by reducing agents and in subjecting the material to further treatment for producing illuminating discharge effects.

5. A process for obtaining vivid color discharge effects according to the principle of reduction, consisting in employing for a discharge printing paste a dyestuff of the gallocyanine series derived from a dialkyl-meta-toluidine and substituted in its oxazine-nucleus by a sulpho anilido group, in conjunction with a reducing agent and with the other ingredients as used for the said purpose, in printing the paste thus obtained upon a ground dyeing capable of being destroyed by reducing agents and in subjecting the material to further treatment for producing illuminating discharge effects.

6. A process for obtaining vivid color discharge effects according to the principle of reduction, consisting in employing for a discharge printing paste a dyestuff of the gallocyanine series derived from diethyl-meta-toluidine and gallic acid and substituted in its oxazine nucleus by a sulpho anilido group, in conjunction with a reducing agent and with the other ingredients as used for the said purpose, in printing the paste thus obtained upon a ground dyeing capable of being destroyed by reducing agents and in subjecting the material to further treatment for producing illuminating discharge effects.

7. A process for obtaining vivid color discharge effects according to the principle of reduction, consisting in employing for a discharge printing paste a dyestuff of the gallocyanine series which is derived from a meta-substituted alkylaniline, in conjunction with hydrosulphite NF and with the other ingredients as used for the said purpose, in printing the paste thus obtained upon a ground dyeing capable of being destroyed by reducing agents and in subjecting the material to further treatment for producing illuminating discharge effects.

In witness whereof we have hereunto signed our names this 11th day of April, 1929.

ERNST HUG.
HEINRICH WERDENBERG.